G. F. MUSTOR.
PACKING.
APPLICATION FILED DEC. 21, 1917.

1,313,201. Patented Aug. 12, 1919.

INVENTOR
Gerald F. Mustor
BY Newell + Neal
ATTORNEYS

UNITED STATES PATENT OFFICE.

GERALD F. MUSTOR, OF BROOKLYN, NEW YORK.

PACKING.

1,313,201.  Specification of Letters Patent.  Patented Aug. 12, 1919.

Application filed December 21, 1917. Serial No. 208,232.

*To all whom it may concern:*

Be it known that I, GERALD F. MUSTOR, a subject of the British Empire, residing at Brooklyn, county of Kings, and State of New York, have invented certain new and useful Improvements in Packing, of which the following is a clear, full, and exact description.

This invention relates to packing, and particularly to packing such as is used in stuffing boxes for sealing against relatively high pressures, as, for example, in the piston rod stuffing boxes of steam engines or pumps.

A general object of the invention is to provide a packing which will have for a given weight a relatively high degree of lateral expansibility under gland pressure, and at the same time will have more permanent resiliency and therefore greater effective durability.

A particular object of the invention is to provide a packing which, in its normal condition, is substantially solid throughout, and yet which, under gland pressure, will form relatively flat, oppositely directed arches surrounding a chamber within said packing, said arches meeting at their ends to form points in the line of gland pressure, whereby the arches are positively supported at their bases by the gland pressure and the lateral resiliency of the packing thus constantly maintained.

Other objects and important features of the invention will appear from the following description and claims when considered in connection with the accompanying drawings, in which—

Figure 1:
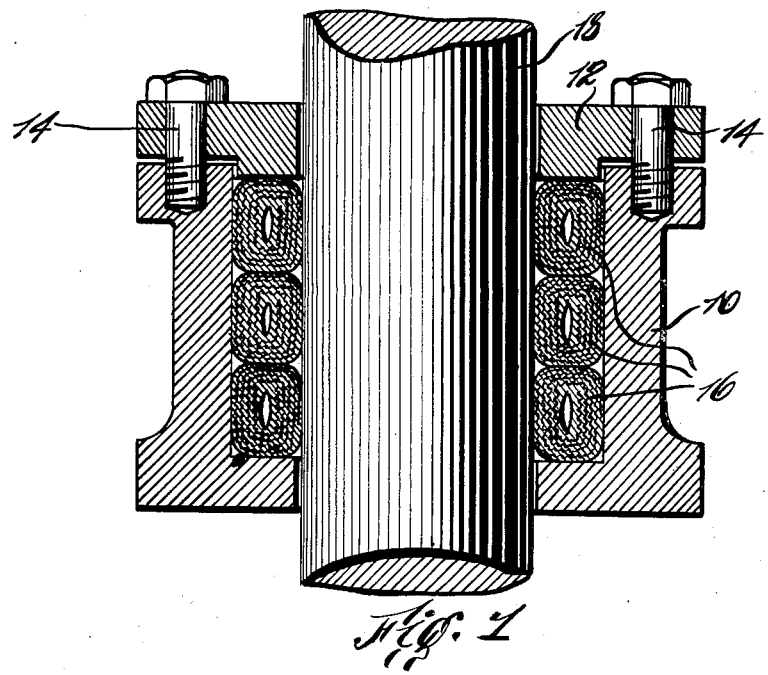
Figure 1 is a sectional view through a stuffing box packed with the improved packing of the present invention, the rod being shown in position.

The illustrated packing, which may be made in the usual spiral coils, is shown in the drawings only in cross-section and comprises in the preferred form a central core 2 of rubber or other suitable resilient material having therein a slit 4 extending lengthwise of the packing, said slit having its greater dimension in the line of the gland pressure and having its sides substantially in contact, the sides of this slit, when the material is made of rubber, being covered by the usual soap-stone powder or other means usually employed to prevent sticking. This core may be made in any convenient way, as, for example, by laying two strips of rubber face to face and covering the contacting faces with powder, or by completely collapsing a tube, or by folding over a strip of rubber, the particular manner of making this core constituting no part of the present invention.

The central core 2 may be surrounded by any ordinary packing material, that herein shown being formed by a spirally wound covering of alternate layers of fabric 6 and friction 8, and the packing in cross-section being preferably elongated along the greater cross-sectional dimension of the slit 4. The parts are preferably all vulcanized together, the slit in whatever manner formed being preferably entirely surrounded by a body of rubber or other material of which the resilient core 2 is formed.

In Fig. 1 of the drawings is illustrated the manner of using the improved packing of the present invention, an ordinary stuffing box being shown at 10. Associated with the stuffing box 10 is a gland 12 connected to the box 10 by cap screws 14, by which the gland 12 may be drawn down upon the stuffing box to exert pressure upon the packing 16, of which three layers are shown surrounding the rod 18.

As hereinabove pointed out, the packing 16 is so placed in the stuffing box that the greater cross-sectional dimension of the slit 4 is in the line of the pressure of the gland 12, the resultant action being illustrated in Fig. 1, in which the sides of the slit 4 are shown as arched in opposite directions by the gland pressure, thus effecting a lateral expansion of the packing and causing it to press tightly against the sides of the rod 18. By a further increase of gland pressure, the opening in the core 2 of the packing will increase its dimension transverse to the direction of gland pressure, but in all cases the opposed arches will meet at points at their ends, and thus each arch will be positively supported by the gland pressure. Moreover, it will be noted that in starting with a substantially closed slit, that is, with a slit having substantially only one cross-sectional dimension, a considerable arching of the sides of the slit, and therefore a considerable lateral expansion of the packing, may be obtained without forming more than a relatively flat arch, such an arch having obviously greater resiliency and greater life than a sharply curved arch. Furthermore, it will be seen that there is a greater reserve of expansibility in the packing of the present invention than in packings heretofore known.

Figure 3:
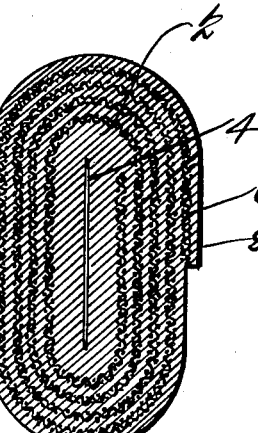
Fig. 3 shows a modified form of packing embodying the present invention.
Figure 2:
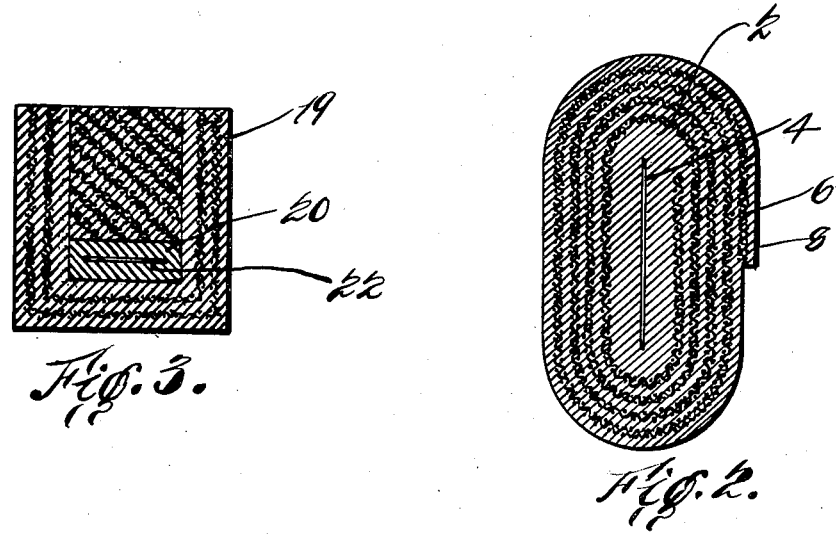
Fig. 2 is a section through the packing in its normal condition, before it has been subjected to gland pressure.

In Fig. 3 of the drawings, the invention is shown as embodied in a packing 19 of rectangular cross-section, in which the resilient core 20 is not exactly at the center of the packing. This packing is, however, intended to be used in the same manner as the preferred form of packing, that is, with the greater cross-sectional dimension of the slit 22 in the core 20 in the line of the gland pressure.

What I claim as new is:—

1. A laterally expansible packing, comprising resilient material of substantial cross section, said packing having within said material a slit extending lengthwise of the material and having its sides in substantial contact, the greater dimension of said slit lying in the direction of gland pressure.

2. A piston rod packing curved in cross section and comprising a resilient core provided with a central slit having its sides normally in substantial contact and with its greater dimension in the line of the gland pressure, said packing being formed of resilient material adapted to arch under gland pressure to opposite sides of the original slit.

3. A piston rod packing having a central resilient core of rubber or similar material, elongated in cross section and provided with a central slit having its sides normally in substantial contact, said slit lying in the greater cross sectional dimension of said core, said core adapted to arch under gland pressure to opposite sides of the original slit, said core being surrounded by a spirally wound cover of alternate layers of fabric and friction.

Signed at New York city, N. Y., this 19th day of December, 1917.

GERALD F. MUSTOR.